US009247457B2

(12) United States Patent
Ozawa (10) Patent No.: US 9,247,457 B2
(45) Date of Patent: Jan. 26, 2016

(54) GATEWAY APPARATUS AND VOICE COMMUNICATION METHOD (75) Inventor: Kazunori Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 328 days.

(21) Appl. No.: 13/990,913

(22) PCT Filed: Dec. 7, 2011

(86) PCT No.: PCT/JP2011/078255
§ 371 (c)(1),
(2), (4) Date: May 31, 2013

(87) PCT Pub. No.: WO2012/077701
PCT Pub. Date: Jun. 14, 2012

(65) Prior Publication Data
US 2013/0242741 A1    Sep. 19, 2013

(30) Foreign Application Priority Data
Dec. 7, 2010    (JP) .................................. 2010-272740

(51) Int. Cl.
*H04W 28/10*    (2009.01)
*H04M 3/36*    (2006.01)
*H04M 7/12*    (2006.01)
(Continued)

(52) U.S. Cl.
CPC .......... *H04W 28/10* (2013.01); *H04L 47/2416* (2013.01); *H04L 47/25* (2013.01); *H04M 3/367* (2013.01); *H04M 7/125* (2013.01);
(Continued)

(58) Field of Classification Search
CPC .............. H04L 47/2416; H04L 47/25; H04W 28/0205; H04W 28/06; H04W 28/10; H04W 88/16
See application file for complete search history.

(56) References Cited

U.S. PATENT DOCUMENTS 6,931,017 B2    8/2005  McGowan
6,978,130 B2   12/2005  Nagata
(Continued)

FOREIGN PATENT DOCUMENTS

JP    2002-247101    8/2002
JP    2003-152752    5/2003
(Continued)

OTHER PUBLICATIONS

International Search Report, PCT/JP2011/078255, Mar. 27, 2012.
(Continued)

*Primary Examiner* — David Oveissi
(74) *Attorney, Agent, or Firm* — Young & Thompson (57) ABSTRACT A gateway apparatus transmits and receives control signal indicative of whether bit rates of voice transmitted and received by mobile terminal connected to packet forwarding apparatus on mobile high-speed network can be changed when congestion is detected in mobile high-speed network and of notification scheme of changed bit rate. When congestion is detected on mobile high-speed network and bit rate of voice transmitted or received by the mobile terminal has been changed, the gateway apparatus converts voice compressed-and-encoded bit stream stored in packet supplied from packet forwarding apparatus from the changed bit rate into bit rate transmittable and receivable by a mobile terminal connected to radio network controller on mobile circuit-switched network and transmits the converted compressed-and-encoded bit stream to radio network controller.

20 Claims, 3 Drawing Sheets (51) Int. Cl.
  H04W 28/02  (2009.01)
  H04L 12/853  (2013.01)
  H04L 12/825  (2013.01)
  *H04W 28/06*  (2009.01)
  *H04W 88/16*  (2009.01)

(52) U.S. Cl.
  CPC .......... *H04W28/0205* (2013.01); *H04W 28/06* (2013.01); *H04W 88/16* (2013.01)

(56) References Cited

U.S. PATENT DOCUMENTS

| | | |
|---|---|---|
| 2003/0035523 A1 | 2/2003 | Mansfield |
| 2003/0142795 A1 | 7/2003 | Gavette et al. |
| 2003/0142798 A1 | 7/2003 | Gavette et al. |
| 2004/0114576 A1 | 6/2004 | Itoh et al. |
| 2004/0168113 A1* | 8/2004 | Murata et al. ............. 714/752 |
| 2004/0203448 A1 | 10/2004 | Nagata |
| 2008/0298247 A1 | 12/2008 | Balachandran et al. |
| 2008/0299963 A1* | 12/2008 | Balachandran et al. ... 455/422.1 |
| 2010/0128727 A1 | 5/2010 | Takechi |
| 2010/0284278 A1* | 11/2010 | Alanara ..................... 370/235 |
| 2011/0032880 A1 | 2/2011 | Ozawa |
| 2011/0075563 A1 | 3/2011 | Leung et al. |
| 2011/0320192 A1 | 12/2011 | Ozawa |
| 2012/0218899 A1 | 8/2012 | Ozawa |

FOREIGN PATENT DOCUMENTS

| | | |
|---|---|---|
| JP | 2003-289380 | 10/2003 |
| JP | 2003-324525 | 11/2003 |
| JP | 2009-267669 | 11/2009 |
| JP | 2010-130175 | 6/2010 |
| JP | 2010-220038 | 9/2010 |
| WO | 2010-104154 | 9/2010 |
| WO | 2011/055721 | 5/2011 |

OTHER PUBLICATIONS

Japanese Official Action—2012-547885—Apr. 22, 2014.
Extended European search report, dated Aug. 3, 2015; Application No. 11847532.6.
"3rd Generation Partnership Project; Technical Specification Group Services and System Aspects; IP Multimedia Subsystem (IMS); Stage 2 (Release 1 O)", 3GPP Standard; 3GPP TS 23.228, 3rd Generation Partnership Project (3GPP), Mobile Competence Centre; No. V10.2.0, Sep. 29, 2010, pp. 1-273.
"3rd Generation Partnership Project; Technical Specification Group Services and System Aspects; IP Multimedia Subsystem (IMS); Multimedia Telephony; Media handling and interaction (Release 9)", 3GPP Standard; 3GPP TS 26.114, 3rd Generation Partnership Project (3GPP), Mobile Competence Centre No. V9.3.0, Jun. 9, 2010, pp. 1-215.

* cited by examiner

GATEWAY APPARATUS AND VOICE COMMUNICATION METHOD

REFERENCE TO RELATED APPLICATION

The present invention is based upon and claims the benefit of the priority of Japanese Patent Application No. 2010-272740, filed on Dec. 7, 2010, the disclosure of which is incorporated herein in its entirety by reference thereto.

The present invention relates to a gateway apparatus and a voice communication method. In particular, it relates to a gateway apparatus and a voice communication method for interconnecting a mobile terminal connected to a mobile high-speed network and a mobile terminal connected to a mobile circuit-switched network and realizing voice communication between these mobile terminals.

BACKGROUND

Currently, regarding mobile phone terminals and mobile networks using W-CDMA (Wideband Code Division Multiple Access) technology of the third generation, voice calls are realized based on a CS (Circuit-Switched) system. Meanwhile, along with the trend of mobile core networks toward use of an IP (Internet Protocol), CSIP (Circuit Switched over IP Network), in which a circuit-switched function is realized with an IP and connection to an IMS (IP Multimedia Subsystem) network is realized, is appearing.

Based on CSIP, on the circuit-switched network, an ISUP (ISDN User Part) call control signal and a voice compressed-and-encoded bit stream are transmitted and received by an ATM bearer. However, on the IMS network, a SIP (Session Initiation Protocol) signal is used for session control, and a voice compressed-and-encoded bit stream is transmitted and received after stored in an RTP (Real-time Transport Protocol) packet.

It is conceivable that, through research and development, mobile networks will be further improved in speed and capacity based on IP. In fact, currently, HSDPA (High Speed Downlink Packet Access), HSPA (High Speed Packet Access), HSPA+, EVDO (Evolved Data Optimized (Only)) Rev.A, and EVDO Rev.B have already been in practical use as mobile access networks.

In addition, along with a further increase in the speed of mobile access networks, LTE (Long Term Evolution) aiming at 100 Mbps (Megabit per second) or greater in the downlink direction and 50 Mbps or greater in the uplink direction and EPC (Evolved Packet Core) as an IP backbone network supporting this LTE are expected to be introduced.

Voice communication needs to be continuously supported for terminals connected to these LTE and EPC, which are expected to appear. In LTE and EPC, VoIP (Voice over Internet Protocol) voice communication is executed by using RTP packets. In addition, the 3GPP (Third Generation Partnership Project) is discussing including a function of changing a voice encoding bit rate when network congestion or the like is detected in the LTE section.

Patent Literature PTL 1 discloses a gateway apparatus interconnecting a mobile circuit-switched network and a mobile IMS network and realizing a video phone.

[PTL 1]
Japanese Patent Kokai Publication No. JP2009-267669A

SUMMARY

The entire disclosure of the above Patent Literature is incorporated herein by reference thereto. Analysis will be hereinafter made based on the present invention.

If LTE and EPC are introduced, until all the existing mobile terminals are replaced by new-type terminals supporting VoIP by LTE or EPC, both the new-type mobile terminals that are connected to the LTE/EPC network and that execute VoIP voice communication and the existing mobile terminals that are connected to an existing mobile circuit-switched network and that execute circuit-switched voice communication are used. Thus, it is necessary to interconnect the voice communication on the mobile circuit-switched network and the VoIP voice communication on the mobile LTE/EPC network. In addition, the 3GPP is discussing a rate adaptation function. With this function, when an eNodeB detects network congestion in the LTE section, the eNodeB notifies a mobile terminal of the congestion, and when the mobile terminal receives the notification, the mobile terminal transmits a request for changing a voice codec bit rate to the network.

However, currently, there is no gateway apparatus available that can interconnect new-type mobile terminals connected to the mobile LTE/EPC network and existing mobile terminals connected to an existing mobile circuit-switched network, counted as a problem.

In addition, even if new-type mobile terminals connected to the mobile LTE/EPC network include the rate adaptation function of changing the audio codec bit rate when congestion in the LTE section is detected, since existing mobile terminals connected to the existing mobile circuit-switched network do not include this function, the existing mobile terminals use a fixed bit rate. Thus, if the LTE network is congested and a new-type mobile terminal wishes to change at least one of the transmission bit rate and the reception bit rate, since the existing terminals cannot accept such change, the bit rate cannot be changed.

As a result, since congestion in the LTE section cannot be avoided and packet loss is caused in the LTE section, the new-type or existing mobile terminal receives an interrupted voice signal, degrading audio quality.

Thus, there is a need in the art to realize voice communication between a mobile terminal connected to a mobile high-speed network and a mobile terminal connected to a mobile circuit-switched network and to prevent degradation of audio quality even when congestion is caused on the mobile high-speed network.

According to a first aspect of the present invention, there is provided a gateway apparatus, comprising:

a control signal transmission and reception unit that exchanges with a mobile terminal connected to a packet forwarding apparatus on the mobile high-speed network a control signal indicative of whether at least one of bit rates of voice transmitted and received by the mobile terminal can be changed when congestion is detected in a mobile high-speed network and of a notification scheme of a changed bit rate; and a conversion unit that converts, when congestion is detected on the mobile high-speed network and the bit rate of voice transmitted or received by the mobile terminal has been changed, a voice compressed-and-encoded bit stream stored in a packet supplied from the packet forwarding apparatus from the changed bit rate notified by the notification scheme into a bit rate transmittable and receivable by a mobile terminal connected to a radio network controller on a mobile circuit-switched network and transmits the converted compressed-and-encoded bit stream to the radio network controller, wherein the gateway apparatus connects voice communication between the packet forwarding apparatus and the radio network controller via an IMS (IP Multimedia Subsystem) network.

According to a second aspect of the present invention, there is provided a voice communication method, comprising:

by a gateway apparatus, connecting voice communication between a packet forwarding apparatus on a mobile high-speed network and a radio network controller on a mobile circuit-switched network via an IMS (IP Multimedia Subsystem) network;

exchanging with a mobile terminal connected to the packet forwarding apparatus a control signal indicative of whether at least one of the bit rates of voice transmitted and received by the mobile terminal can be changed when congestion is detected on the mobile high-speed network and of a notification scheme of a changed bit rate; and converting, when congestion is detected on the mobile high-speed network and the bit rate of voice transmitted or received by the mobile terminal has been changed, a voice compressed-and-encoded bit stream stored in a packet supplied from the packet forwarding apparatus from the changed bit rate notified by the notification scheme into a bit rate transmittable and receivable by a mobile terminal connected to the radio network controller, and transmitting the converted compressed-and-encoded bit stream to the radio network controller. According to a third aspect of the present invention, there is provided a non-transient computer-readable recording medium, storing a program that causes a gateway apparatus to execute:

connecting voice communication between a packet forwarding apparatus on a mobile high-speed network and a radio network controller on a mobile circuit-switched network via an IMS (IP Multimedia Subsystem) network;

exchanging with a mobile terminal connected to the packet forwarding apparatus a control signal indicative of whether at least one of the bit rates of voice transmitted and received by the mobile terminal can be changed when congestion is detected on the mobile high-speed network and of a notification scheme of a changed bit rate; and converting, when congestion is detected on the mobile high-speed network and the bit rate of voice transmitted or received by the mobile terminal has been changed, a voice compressed-and-encoded bit stream stored in a packet supplied from the packet forwarding apparatus from the changed bit rate notified by the notification scheme into a bit rate transmittable and receivable by a mobile terminal connected to the radio network controller, and transmitting the converted compressed-and-encoded bit stream to the radio network controller.

The present invention provides the following advantages, but not restricted thereto. The gateway apparatus and the voice communication method according to the present invention can realize voice communication between a mobile terminal connected to a mobile high-speed network and a mobile terminal connected to a mobile circuit-switched network and prevent degradation of audio quality even when congestion is caused on the mobile high-speed network.

PREFERRED MODES

In the present disclosure, there are various possible modes, which include the following, but not restricted thereto. First, an outline of the present disclosure will be described. However, the reference characters in the following outline are merely used as examples to facilitate understanding of the present invention. Therefore, the reference signs are not intended to limit the present invention to the illustrated modes.

Figure 1:
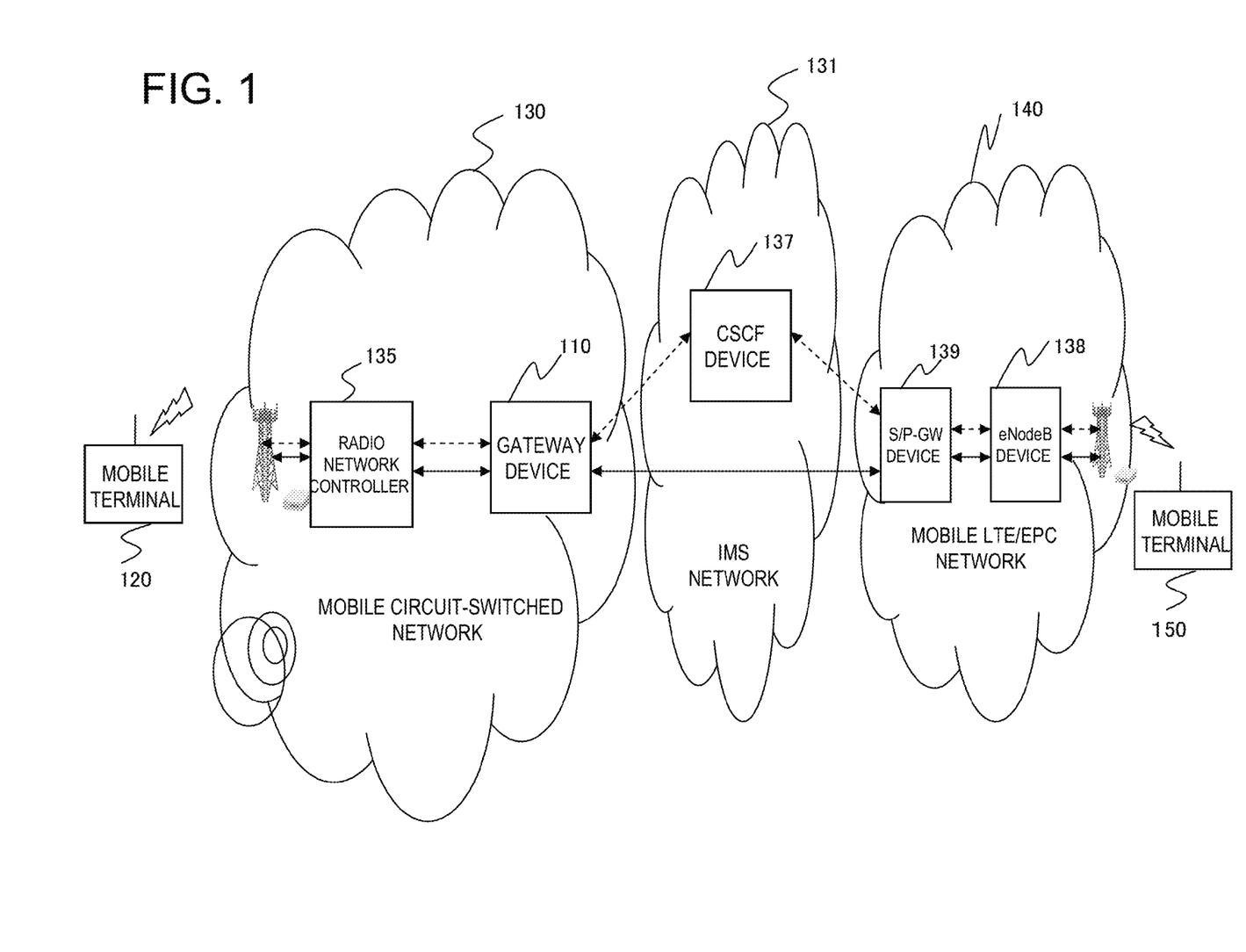
FIG. 1 illustrates a network configuration of a communication system including a gateway apparatus according to a first exemplary embodiment.
Figure 2:
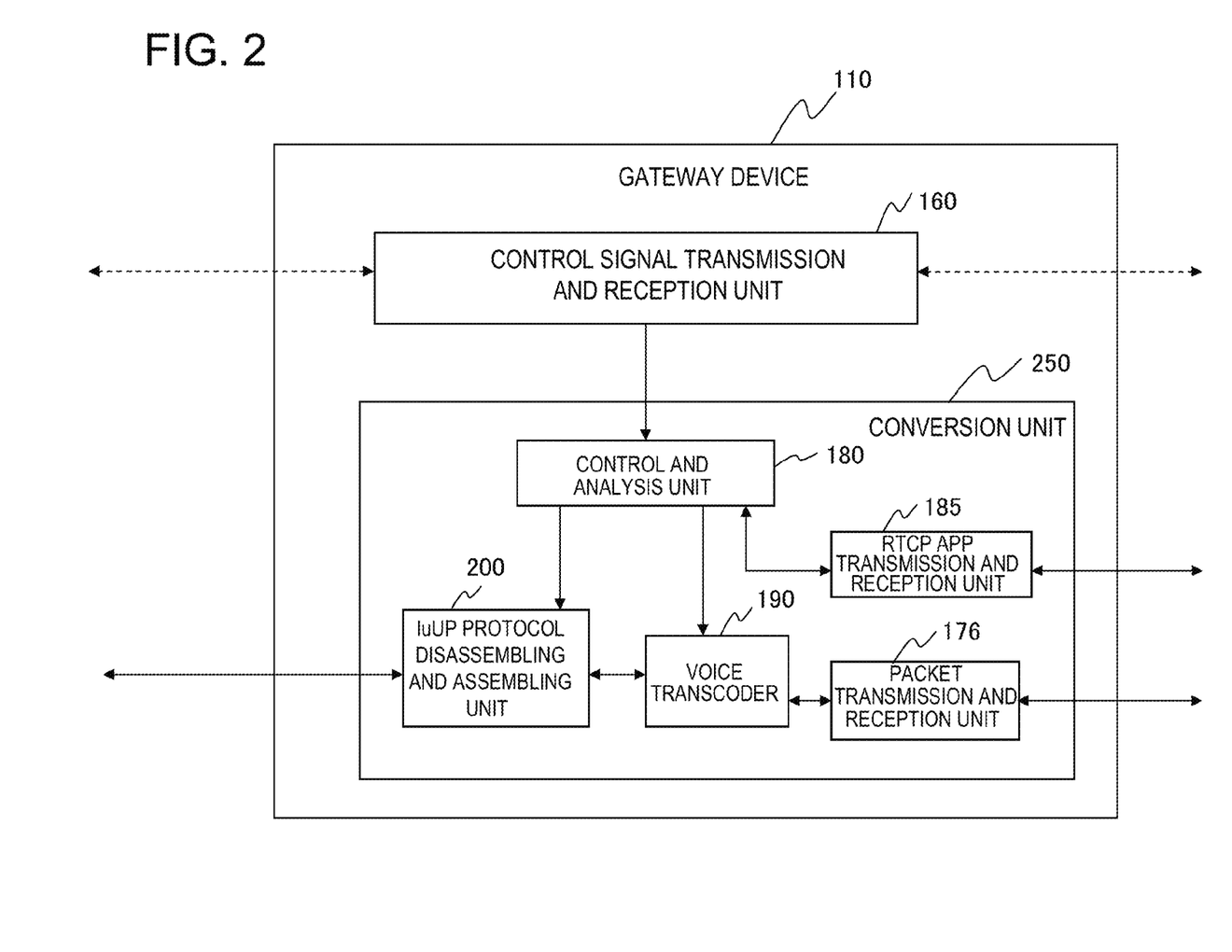
FIG. 2 is a block diagram illustrating a configuration of the gateway apparatus according to the first exemplary embodiment.

Referring to FIGS. 1 and 2, a gateway apparatus (110) according to the present disclosure comprises a control signal transmission and reception unit (160) and a conversion unit (250) and connects voice communication between a packet forwarding apparatus (for example, an S/P-GW apparatus 139) and a radio network controller (135) via an IMS (IP Multimedia Subsystem) network (131). The control signal transmission and reception unit (160) exchanges with the mobile terminal (150) a control signal indicative of whether at least one of the bit rates of voice transmitted and received by a mobile terminal (150) connected to the packet forwarding apparatus (139) on the mobile high-speed network can be changed when congestion is detected in a mobile high-speed network (for example, a mobile LTC/EPC network 140) and of a notification scheme of a changed bit rate. When congestion is detected on the mobile high-speed network (140) and the bit rate of voice transmitted or received by the mobile terminal (150) has been changed, the conversion unit (250) converts a voice compressed-and-encoded bit stream stored in a packet supplied from the packet forwarding apparatus (139) from the changed bit rate notified by the above notification scheme into a bit rate transmittable and receivable by a mobile terminal (120) connected to the radio network controller (135) on a mobile circuit-switched network (130). In addition, the conversion unit (250) transmits the converted compressed-and-encoded bit stream to the radio network controller (135).

In addition, it is preferable that, when congestion is detected on the mobile high-speed network and when the bit rate of voice transmitted or received by the mobile terminal (150) has been changed, the conversion unit (250) converts a voice compressed-and-encoded bit stream supplied from the radio network controller (135) into the changed bit rate notified by the above notification scheme and transmits the converted compressed-and-encoded bit stream to the packet forwarding apparatus.

In the above notification scheme, the notification scheme may comprise notifying the changed bit rate using RTCP (Real-time Transport Control Protocol) APP or CMR (Codec Mode Request).

In addition, the control signal transmission and reception unit (160) may transmit and receive the control signal using SIP (Session Initiation Protocol)/SDP (Session Description Protocol).

In addition, the mobile high-speed network may be HSPA (High Speed Packet Access), HSPA+, HNB (Home NodeB), HeNB (Home eNodeB), or WiMax (Worldwide Interoperability for Microwave Access), instead of the mobile LTE (Long Term Evolution)/EPC (Evolved Packet Core) network 140.

According to the present invention, even when an existing mobile terminal that is connected to an existing mobile circuit-switched network and that executes circuit-switched voice communication and a new mobile terminal that is connected to a mobile LTE/EPC network and that executes VoIP communication coexist, interconnection between these terminals can be achieved.

In addition, if a new-type terminal connected to a mobile LTE/EPC network has a rate adaptation function that can change the bit rate of a voice codec when notified of congestion in the LTE section, the gateway apparatus according to the present invention can determine whether the bit rate can be changed. If the bit rate can be changed, the gateway apparatus can use SIP/SDP to exchange information with the mobile terminal about whether notification of the changed bit rate needs to be executed by RTCP (Real-time Transport Control Protocol) APP (Application) or CMR (Codec Mode Request).

In addition, the gateway apparatus can receive a compressed-and-encoded bit stream from the mobile terminal that has changed the bit rate and can transmit a compressed-and-encoded bit stream converted in accordance with the changed bit rate to the new-type terminal. Thus, the gateway apparatus according to the present invention can avoid congestion in the LTE section. As a result, since generation of packet loss can be avoided, the new-type or existing mobile terminal does not receive an interrupted voice signal, whereby degradation of audio quality can be prevented.

In addition, according to the present invention, the following modes are possible.

[Mode 1]
There is provided a gateway apparatus according to the above first aspect.

[Mode 2]
When congestion is detected on the mobile high-speed network and the bit rate of voice transmitted or received by the mobile terminal connected to the packet forwarding apparatus has been changed, the conversion unit may convert a voice compressed-and-encoded bit stream supplied from the radio network controller into the changed bit rate notified by the notification scheme, and transmit the converted compressed-and-encoded bit stream to the packet forwarding apparatus.

[Mode 3]
In a gateway apparatus according to any one of the above modes, the notification scheme may comprise notifying the changed bit rate is executed using RTCP (Real-time Transport Control Protocol) APP or CMR (Codec Mode Request).

[Mode 4]
The control signal transmission and reception unit may transmit and receive the control signal using SIP (Session Initiation Protocol)/SDP (Session Description Protocol).

[Mode 5]
In the gateway apparatus according to any one of the above modes, the mobile high-speed network may be at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

[Mode 6]
There is provided a voice communication method according to the above second aspect.

[Mode 7]
The voice communication method may comprise: by the gateway apparatus, converting, when congestion is detected on the mobile high-speed network and the bit rate of voice transmitted or received by the mobile terminal connected to the packet forwarding apparatus has been changed, a voice compressed-and-encoded bit stream supplied from the radio network controller into the changed bit rate notified by the notification scheme, and transmitting the converted compressed-and-encoded bit stream to the packet forwarding apparatus.

[Mode 8]
In the voice communication method according to any one of the above modes, the notification scheme may comprise notifying the changed bit rate is executed using RTCP (Real-time Transport Control Protocol) APP or CMR (Codec Mode Request).

[Mode 9]
In the voice communication method according to any one of the above modes, the control signal may be transmitted and received using SIP (Session Initiation Protocol)/SDP (Session Description Protocol).

[Mode 10]
In the voice communication method according to any one of the above modes, the mobile high-speed network may be at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

[Mode 11]
In addition, according to the present invention, there is provided a program causing a gateway apparatus to execute:
connecting voice communication between a packet forwarding apparatus on a mobile high-speed network and a radio network controller on a mobile circuit-switched network via an IMS (IP Multimedia Subsystem) network;
exchanging with a mobile terminal connected to the packet forwarding apparatus a control signal indicative of whether at least one of the bit rates of voice transmitted and received by the mobile terminal can be changed when congestion is detected on the mobile high-speed network and of a notification scheme of a changed bit rate; and
converting, when congestion is detected on the mobile high-speed network and the bit rate of voice transmitted or received by the mobile terminal has been changed, a voice compressed-and-encoded bit stream stored in a packet supplied from the packet forwarding apparatus from the changed bit rate notified by the notification scheme into a bit rate transmittable and receivable by a mobile terminal connected to the radio network controller, and transmitting the converted compressed-and-encoded bit stream to the radio network controller.

The program may be provided as a program product recoded in a non-transient computer-readable recording medium.

First Exemplary Embodiment

A configuration and an operation of a gateway apparatus according to a first exemplary embodiment will be described with reference to the drawings. FIG. 1 illustrates a network configuration of a voice communication system including a gateway apparatus according to the present exemplary embodiment.

In FIG. 1, the voice communication system includes: a gateway apparatus 110 and a radio network controller 135 arranged in a mobile circuit-switched network 130; a session control (CSCF: Call Session Control Function) apparatus 137 arranged in an IMS network 131; an S/P-GW (Serving/Packet data-Gateway) apparatus 139 and an eNodeB apparatus 138 arranged in a mobile LTE/EPC network 140; and mobile terminals 120 and 150.

In the example in FIG. 1, the mobile LTE/EPC network 140 is used as a mobile high-speed network. Alternatively, HSPA or HSPA+ may be used as a mobile high-speed network.

The gateway apparatus 110 interconnects a packet forwarding apparatus (for example, the S/P-GW apparatus 139)

on the mobile LTE/EPC network 140 and the radio network controller (RNC) 135 on the mobile circuit-switched network 130 via the IMS network 131 and interconnects voice communication between the mobile terminal 150 connected to the mobile LTE/EPC network 140 and the mobile terminal 120 connected to the radio network controller 135.

In FIG. 1, a call control signal is forwarded by an LTE/EPC bearer between the gateway apparatus 110 and the packet forwarding apparatus connected to the mobile LTE/EPC network 140, by using SIP used for IMS and VoIP. In addition, a voice signal between the gateway apparatus 110 and the packet forwarding apparatus is forwarded by using an RTP/UDP/IP packet. In the following exemplary embodiment, the S/P-GW apparatus 139 is used as the packet forwarding apparatus. Alternatively, an xGSN apparatus may be used as the packet forwarding apparatus.

A voice signal between the gateway apparatus 110 and the radio network controller 135 on the mobile circuit-switched network 130 is forwarded by using the IuUP (Iu U-Plane) protocol, which is a circuit-switched protocol.

In FIG. 1, the mobile terminal 120 is a voice call terminal connected to the mobile circuit-switched network 130. As the mobile terminal 120, an existing voice call terminal can be used without adding any modification thereto. The mobile terminal 120 is connected to the mobile circuit-switched network 130 and exchanges a call control signal and a voice signal with the gateway apparatus 110 via the radio network controller 135.

For example, the mobile terminal 120 includes an AMR (Adaptive Multi-Rate) voice codec as a voice codec and transmits and receives a bit stream obtained by compressing and encoding a voice signal at a bit rate of 12.2 kbps. Details of the AMR voice codec are defined by TS (Technical Specification) 26.090 standards of the 3GPP.

For example, the gateway apparatus 110 exchanges ISUP (Integrated Services Digital Network User Part) as a call processing signal used in the mobile circuit-switched network 130 and an AMR compressed-and-encoded bit stream as voice data with the mobile terminal 120. In addition, to interconnect the mobile circuit-switched network 130 and the mobile LTE/EPC network 140 via the IMS network 131, the gateway apparatus 110 converts the above call processing signal into a SIP/SDP (Session Initiation Protocol/Session Description Protocol) call control signal and outputs this signal to the CSCF apparatus 137 on the IMS network. The signal is outputted to the S/P-GW apparatus 139 on the mobile LTE/EPC network 140 via the CSCF apparatus 137.

The S/P-GW apparatus 139 uses the GTP-C protocol to execute tunneling and output the SIP/SDP call control signal to the eNodeB apparatus 138.

Next, the eNodeB apparatus 138 outputs this call control signal to a radio section, and the mobile terminal 150 receives the call control signal.

In the reverse direction, the eNodeB 138 receives a SIP/SDP call control signal transmitted from the mobile terminal 150 via a radio section. Next, the eNodeB 138 uses GTP-C to execute tunneling and forward the signal to the S/P-GW apparatus 139, and the CSCF apparatus 137 receives the signal as a SIP/SDP signal.

The gateway apparatus 110 receives the SIP/SDP call control signal from the CSCF apparatus 137 and converts the signal into the above ISUP or the like. The gateway apparatus 110 outputs the converted signal to the radio network controller 135, which transmits the signal to the mobile terminal 120 via a radio section.

Next, a U-plane voice signal will be described. The mobile terminal 120 transmits an AMR-compressed voice bit stream at 12.2 kbps to the radio network controller 135 via a radio section. The radio network controller 135 stores the stream in an IuUP protocol frame and transmits the IuUP protocol frame to the gateway apparatus 110. Details of the IuUP protocol can be found in TS25.415 or TS26.102 standards of the 3GPP.

The gateway apparatus 110 extracts the AMR bit stream from the IuUP protocol frame, stores the AMR bit stream in an RTP packet payload, and forwards the AMR bit stream as an RTP/UDP/IP packet to the S/P-GW apparatus 139 on the mobile LTE/EPC network 140 via the IMS network 131.

The S/P-GW apparatus 139 receives the RTP/UDP/IP packet, adds a GTP-U header to the RTP packet payload portion, and forwards the packet as a GTP-U/UDP/IP packet to the eNodeB apparatus 138 by tunneling.

The eNodeB apparatus 138 extracts the GTP-U packet payload portion and outputs the packet as an RTP packet to the mobile terminal 150 via a radio section.

After receiving the RTP packet, the mobile terminal 150 extracts the AMR bit stream and reproduces voice by executing AMR coding.

Since a signal flow from the mobile terminal 150 to the mobile terminal 120 is opposite to the above signal flow, description of the signal flow in the reverse direction will be omitted.

The following operation is executed in the communication system including the gateway apparatus 110 according to the present exemplary embodiment. First, when traffic congestion is detected, the mobile terminal 150 and the gateway apparatus 110 use SIP/SDP and notify each other that change of the bit rate is possible. Second, for notification of change of the bit rate, whether a CMR or RTCP signal is used is described in SDP. Third, when the mobile LTE/EPC network 140 detects traffic congestion in the LTE section, the mobile terminal 150 and the gateway apparatus 110 notify each other of change of the bit rate in accordance with the method described in SDP. Fourth, the gateway apparatus 110 includes a function of changing an AMR transmission/reception bit rate. Since the mobile terminal 120 is an existing terminal based on a circuit-switched system and is fixed at AMR 12.2 kbps, a voice transcoder of the gateway apparatus 110 converts the bit rate in accordance with change of the bit rate of the mobile terminal 150.

Next, a configuration for realizing the first to fourth operations will be described. By using SIP/SDP, the mobile terminal 150 describes an AMR bit rate conversion capability thereof in SDP and notifies the gateway apparatus 110 of the capability. By using an offer/answer process of SDP, the mobile terminal 150 and the gateway apparatus 110 notify each other of the AMR bit rate conversion capability. More specifically, the mobile terminal 150 transmits an offer of ecn-capable-rtp to the gateway apparatus 110 in SDP, and in response, the gateway apparatus 110 replies an answer describing ecn-capable-rtp in SDP. Through this process, the mobile terminal 150 and the gateway apparatus 110 determine that both the mobile terminal 150 and the gateway apparatus 110 can change the AMR bit rate.

In addition, when notifying each other of change of the bit rate, the mobile terminal 150 and the gateway apparatus 110 describe use of CMR or RTCP in SDP. The following description will be made as an example, assuming that RTCP APP is used.

When the eNodeB apparatus 138 detects congestion in the LTE section of the mobile LTE/EPC network 140, the eNodeB apparatus 138 sets an ECN-CE (Explicit Congestion Notification-Congestion Experienced) flag in an IP header of a packet and transmits the packet to the mobile terminal 150.

When such ECN-CE flag is set in an IP header of a packet received from the eNodeB apparatus 138, the mobile terminal 150 determines congestion in the LTE section of the mobile LTE/EPC network 140. Thus, the mobile terminal 150 determines that the AMR bit rate needs to be lowered (for example, from 12.2 kbps to 6.8 kbps) and transmits an RTCP APP signal to the gateway apparatus 110. The mobile terminal 150 describes change of the bit rate and the bit rate that has been changed in RTCP APP and outputs the information to the eNodeB apparatus 138.

FIG. 2 illustrates a configuration of the gateway apparatus 110 in FIG. 1. In FIG. 2, the gateway apparatus 110 includes a control signal transmission and reception unit 160 and a conversion unit 250. The conversion unit 250 includes a control and analysis unit 180, an IuUP protocol disassembling and assembling unit 200, a voice transcoder 190, and a packet transmission and reception unit 176.

First, an operation executed when the LTE is not congested will be described. The control signal transmission and reception unit 160 receives a SIP call control signal from the CSCF apparatus 137 on the IMS network 131, converts the signal into an ISUP signal used with the mobile circuit-switched system, and transmits the ISUP signal to the radio network controller 135 on the mobile circuit-switched network 130. In addition, after the control signal transmission and reception unit 160 determines no reception of an adaptation request signal from the CSCF apparatus 137, the control signal transmission and reception unit 160 instructs the control and analysis unit 180 to start communication with an allocated channel.

When receiving the instruction for starting communication from the control signal transmission and reception unit 160, if the control and analysis unit 180 does not receive an adaptation request signal, the control and analysis unit 180 determines that both the mobile terminals 150 and 120 use the same AMR bit rate of 12.2 kbps. Thus, the control and analysis unit 180 instructs the voice transcoder 190 not to execute a conversion process. In addition, the control and analysis unit 180 instructs the IuUP protocol disassembling and assembling unit 200 to disassemble and assemble the IuUP protocol.

The packet transmission and reception unit 176 receives an RTP/UDP/IP packet storing an AMR compressed-and-encoded bit stream of 12.2 kbps from the S/P-GW apparatus 139 and outputs the packet to the voice transcoder 190.

When receiving the instruction from the control and analysis unit 180, the voice transcoder 190 skips a conversion process, execute a through process on the AMR compressed-and-encoded bit stream of 12.2 kbps, and outputs the bit stream to the IuUP protocol disassembling and assembling unit 200.

The IuUP protocol disassembling and assembling unit 200 stores the AMR compressed-and-encoded bit stream of 12.2 kbps transmitted from the voice transcoder unit 190 in a payload portion in IuUP frame format and transmits the IuUP frame to the radio network controller 135.

Next, an operation in the reverse direction executed when the LTE section is not congested will be described. Regarding the C-Plane, the control signal transmission and reception unit 160 receives an ISUP signal from the radio network controller 135, converts the signal into a SIP/SDP signal, and transmits the SIP/SDP signal to the S/P-GW apparatus 139 via the CSCF apparatus 137.

The S/P-GW apparatus 139 uses the GTP-C protocol to forward the received SIP/SDP signal to the eNodeB apparatus 138 by tunneling.

The eNodeB apparatus 138 extracts the SIP/SDP signal from the GTP-C packet and transmits the SIP/SDP signal to the mobile terminal 150 via an LTE radio section.

The mobile terminal 150 receives the SIP/SDP signal to control the session and to control transmission and reception of a voice signal.

Regarding the U-Plane, the IuUP protocol disassembling and assembling unit 200 receives the IuUP frame protocol from the radio network controller 135, reads the AMR compressed-and-encoded bit stream of 12.2 kbps stored in a payload, and outputs the bit stream to the voice transcoder 190.

The voice transcoder 190 transmits the AMR compressed-and-encoded stream of 12.2 kbps to the packet transmission and reception unit 176, without executing conversion.

The packet transmission and reception unit 176 stores the AMR compressed-and-encoded bit stream of 12.2 kbps in a payload of an RTP packet and transmits the packet to the S/P-GW apparatus 139. For example, RFC (Request For Comments) 3267 of the IETF (Internet Engineering Task Force) can be used as the RTP payload format.

Next, an operation executed when the eNodeB apparatus 138 detects congestion in the LTE section will be described. If the control signal transmission and reception unit 160 of the gateway apparatus 110 receives SIP/SDP ecn-capable-rtp from the mobile terminal 150 via the CSCF apparatus 137, the control signal transmission and reception unit 160 transmits an answer in which ecn-capable-rtp is described in SDP to the S/P-GW apparatus 139 via the CSCF apparatus 137. The mobile terminal 150 and the gateway apparatus 110 describe information representing whether RTCP APP or CMR is used for notification of change of the bit rate in SDP. In this way, the mobile terminal 150 and the gateway apparatus 110 notify each other of whether RTCP APP or CMR is used. An example in which RTCP APP is used will hereinafter be described.

If an RTCP APP transmission and reception unit 185 receives an RTCP APP signal from the mobile terminal 150 via the S/P-GW apparatus 139, the RTCP APP transmission and reception unit 185 reads information about change of the AMR bit rate from the RTCP APP signal and outputs the information to the control and analysis unit 180. In this example, the information about change of the AMR bit rate indicates change of the AMR bit rate from 12.2 kbsp to 6.8 kbps, for example.

When the control and analysis unit 180 is notified of the bit rate change information by the RTCP APP transmission and reception unit 185 or when an instruction for starting communication is supplied from the control and analysis unit 180, for example, if change of the bit rate represents change from 12.2 kbps to 6.8 kbps in both of the uplink and downlink directions, a voice transcoder is necessary. Thus, the control and analysis unit 180 instructs the voice transcoder 190 to execute AMR voice transcoding and to change the bit rate from 12.2 kbps to 6.8 kbps.

In addition, with respect to the RTCP APP transmission and reception unit 185, the control and analysis unit 180 describes information indicating that the AMR bit rate of packets transmitted to the mobile terminal 150 needs be changed to 6.8 kbps. Next, the control and analysis unit 180 transmits an RTCP APP packet to the S/P-GW apparatus 139.

The voice transcoder 190 receives the instructions for starting communication, executing transcoding, and changing the bit rate, activates AMR voice transcoders in both of the directions, and converts the bit rate from 12.2 kbps to 6.8 kbps. More specifically, the voice transcoder 190 converts the AMR bit stream stored in the RTP packet received from the packet transmission and reception unit 176 from 6.8 kbps to 12.2 kbps and outputs the converted bit stream to the IuUP protocol disassembling and assembling unit 200. In the reverse direction, the voice transcoder 190 converts an AMR stream supplied from the IuUP protocol disassembling and assembling unit 200 from 12.2 kbps to 6.8 kbps and outputs the converted stream to the packet transmission and reception unit 176.

The IuUP protocol disassembling and assembling unit 200 stores the AMR bit stream of 12.2 kbps supplied from the voice transcoder 190 in a payload portion of an IuUP circuit-switched protocol frame and transmits the protocol frame to the radio network controller 135. More specifically, the IuUP protocol disassembling and assembling unit 200 reads CMR or the like in an RFC3267 RTP payload format header, assembles an IuUP circuit-switched protocol frame based on CMR, stores the AMR compressed-and-encoded stream in RAB (Radio Access Bearer) SubFlow of an IuUP payload portion, and transmits the packet to the radio network controller 135 via a circuit-switched bearer.

Next, the reverse direction will be described. The IuUP protocol disassembling and assembling unit 200 converts an IuUP protocol frame supplied from the radio network controller 135 into the RFC3267 protocol.

More specifically, the IuUP protocol disassembling and assembling unit 200 reads an AMR compressed-and-encoded bit stream of 12 kbps stored in RAB SubFlow of an IuUP protocol frame payload portion and outputs the read bit stream to the voice transcoder 190.

The voice transcoder 190 receives the instructions for starting communication and executing transcoding from the control and analysis unit 180, converts the AMR compressed-and-encoded bit stream supplied from the IuUP protocol disassembling and assembling unit 200 from 12.2 kbps to 6.8 kbps, and transmits the converted bit stream to the packet transmission and reception unit 176.

The packet transmission and reception unit 176 establishes an RTP payload format header and stores the AMR compressed-and-encoded bit stream of 6.8 kbps in an RTP payload portion.

The packet transmission and reception unit 176 transmits an RTP/UDP (User Datagram Protocol)/IP packet to the S/P-GW apparatus 139 on the mobile LTE/EPC network 140 via the IMS network 131.

Second Exemplary Embodiment

Figure 3:
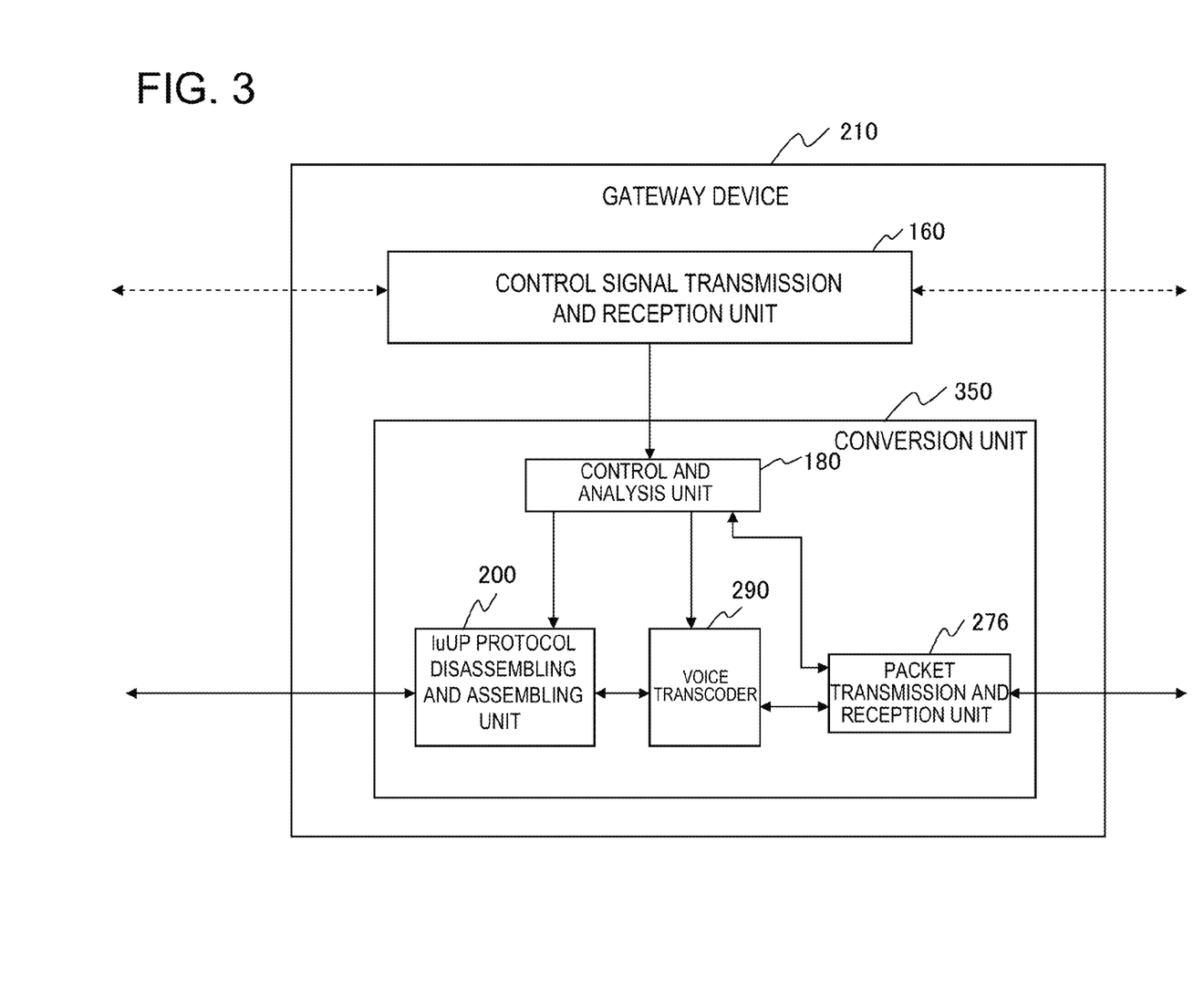
FIG. 3 is a block diagram illustrating a configuration of a gateway apparatus according to a second exemplary embodiment.

A configuration and an operation of a gateway apparatus according to a second exemplary embodiment will be described with reference to the drawings. FIG. 3 is a block diagram illustrating a configuration of a gateway apparatus 210 according to the present exemplary embodiment. In FIGS. 2 and 3, constituent elements denoted by the same reference signs operate in the same way. Thus, description of these elements will be omitted.

The present exemplary embodiment will be described assuming that notification of change of the bit rate will be executed by using a CMR signal.

With the configuration illustrated in FIG. 3, when the mobile terminal 150 detects ECN-CE and changes the bit rate of AMR voice coding, an AMR voice codec of the mobile terminal 150 changes the bit rate to 6.8 kbps, for example. The mobile terminal 150 describes the changed bit rate (6.8 kbps) in an CMR field in RTP payload format defined by IETF RFC3267, stores the AMR compressed-and-encoded bit stream of 6.8 kbps in an RTP payload, transmits an RTP packet to the gateway apparatus 210 via the eNodeB apparatus 138 and the S/P-GW apparatus 139.

An operation executed when the eNodeB detects congestion in the LTE section will be described. If the control signal transmission and reception unit 160 of the gateway apparatus 210 receives SIP/SDP ecn-capable-rtp from the mobile terminal 150 via the CSCF apparatus 137, the control signal transmission and reception unit 160 transmits an answer in which ecn-capable-rtp is described in SDP to the S/P-GW apparatus 139 via the CSCF apparatus 137. The mobile terminal 150 and the gateway apparatus 210 describe information that CMR is used for notification of change of the bit rate in SDP. In this way, the mobile terminal 150 and the gateway apparatus 210 notify each other of use of CMR.

After receiving the RTP packet from the S/P-GW apparatus 139, a packet transmission/reception unit 276 checks the CMR field of the RTP payload format portion, extracts information about change of the AMR bit rate, and outputs the information to the control and analysis unit 180. In addition, the packet transmission/reception unit 276 reads an AMR compressed-and-encoded bit stream from an RTP payload portion and outputs the bit rate information and the AMR compressed-and-encoded bit stream to a voice transcoder 290.

After receiving the information about change of the AMR bit rate from the packet transmission/reception unit 276, the control and analysis unit 180 determines that the changed bit rate is 6.8 kbps, notifies the voice transcoder 290 of start of a conversion, and gives an instruction for converting the AMR bit rate from 6.8 kbps to 12.2 kbps.

The voice transcoder 290 receives the notification of start of a conversion and the instruction for converting the bit rate from the control and analysis unit 180 and receives an AMR compressed-and-encoded bit stream of 6.8 kbps from the packet transmission/reception unit 276. Next, the voice transcoder 290 converts the AMR compressed-and-encoded bit stream from 6.8 kbps to 12.2 kbps and outputs the converted bit stream to the IuUP protocol disassembling and assembling unit 200.

Voice communication in the reverse direction can be realized by executing the above process in the reverse direction.

In the above first and second exemplary embodiments, a tandem transcoder formed by a combination of a full decoder and a full re-encoder may be used as the AMR voice transcoder. Alternatively, a non-tandem transcoder that decodes and re-encodes only a part of an AMR compressed-and-encoded bit stream may be used. Compared with the former, the latter can reduce the processing delay and amount.

In the above exemplary embodiments, other than the above AMR, another codec such as AMR-WB (Adaptive Multi-Rate Wideband) or G.711 may be used as a voice codec for generating a voice compressed-and-encoded bit stream.

In addition, other than the above protocol, another protocol such as GTP-U (GPRS Tunneling Protocol.User) may be used as a protocol for storing a voice compressed-and-encoded stream transmitted to and received from the S/P-GW apparatus 139.

In addition, instead of arranging the control and analysis unit 180 in the conversion unit 250 as in the above exemplary embodiments, the control and analysis unit 180 may be arranged in the control signal transmission and reception unit 160.

In addition, the control signal transmission and reception unit 160 and the conversion unit 250 (350) may be provided separately in different units. If this configuration is used, for example, ITU-T (International Telecommunication Union-Telecommunication sector) H.248 MEGACO (Media Gateway Control) protocol may be used to exchange a control signal between the control signal transmission and reception unit 160 and the conversion unit 250 (350).

In addition, the voice transcoder 190 (290) may be provided in a unit separately from the gateway apparatus 110 (210).

In addition, other than LTE and EPC, examples of the mobile high-speed network include HSPA, HSPA+, HNB (Home NodeB), HeNB (Home eNodeB), and WiMax (Worldwide Interoperability for Microwave Access).

In addition, in the above exemplary embodiments, functions and processes of the control signal transmission and reception unit 160 and the conversion unit 250 (350) of the gateway apparatus 110 (210) may be realized by a computer program executed on a computer constituting the gateway apparatus 110 (210).

The entire disclosures of the above Patent Literature are incorporated herein by reference thereto. Modifications and adjustments of the examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

110, 210 gateway apparatus
120, 150 mobile terminal
130 mobile circuit-switched network
131 IMS network
135 radio network controller (RNC)
137 CSCF apparatus
138 eNodeB apparatus
139 S/P-GW apparatus
140 mobile LTE/EPC network
160 control signal transmission and reception unit
176, 276 packet transmission/reception unit
180 control and analysis unit
185 RTCP APP transmission and reception unit
190, 290 voice transcoder
200 IuUP protocol disassembling and assembling unit
250, 350 conversion unit

The invention claimed is:

1. A gateway apparatus, comprising:
a control signal transmission and reception unit that exchanges with a first mobile terminal connected to a packet forwarding apparatus on a mobile high-speed network a control signal indicative of whether at least one of bit rates of voice transmitted and received by the first mobile terminal can be changed when congestion has occurred in a mobile high-speed network and indicative of a notification scheme of a changed bit rate between the gateway apparatus and the first mobile terminal; and
a conversion unit that converts, when congestion has occurred on the mobile high-speed network and a bit rate of voice transmitted or received by the first mobile terminal has been changed to the changed bit rate, a bit rate of a voice compressed-and-encoded bit stream stored in a packet supplied from the packet forwarding apparatus, from the changed bit rate notified by the notification scheme into a bit rate transmittable and receivable by a second mobile terminal connected to a radio network controller on a mobile circuit-switched network, and transmits the converted compressed-and-encoded bit stream to the radio network controller,
wherein the gateway apparatus connects voice communication between the packet forwarding apparatus and the radio network controller via an IMS (IP Multimedia Subsystem) network.

2. The gateway apparatus according to claim 1, wherein, when congestion has occurred on the mobile high-speed network and the bit rate of voice transmitted or received by the first mobile terminal connected to the packet forwarding apparatus has been changed, the conversion unit converts a voice compressed-and-encoded bit stream supplied from the radio network controller into the changed bit rate notified by the notification scheme, and transmits the converted compressed-and-encoded bit stream to the packet forwarding apparatus.

3. The gateway apparatus according to claim 1, wherein the notification scheme comprises notifying the changed bit rate is executed using RTCP (Real-time Transport Control Protocol) APP or CMR (Codec Mode Request).

4. The gateway apparatus according to claim 1, wherein the control signal transmission and reception unit transmits and receives the control signal using SIP (Session Initiation Protocol)/SDP (Session Description Protocol).

5. The gateway apparatus according to claim 1, wherein the mobile high-speed network is at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

6. A voice communication method, comprising:
by a gateway apparatus, connecting voice communication between a packet forwarding apparatus on a mobile high-speed network and a radio network controller on a mobile circuit-switched network via an IMS (IP Multimedia Subsystem) network;
exchanging with a first mobile terminal connected to the packet forwarding apparatus a control signal indicative of whether at least one of the bit rates of voice transmitted and received by the first mobile terminal can be changed when congestion has occurred on the mobile high-speed network and indicative of a notification scheme of a changed bit rate between the gateway apparatus and the first mobile terminal; and
converting, when congestion has occurred on the mobile high-speed network and a bit rate of voice transmitted or received by the first mobile terminal has been changed to the changed bit rate, a bit rate of a voice compressed-and-encoded bit stream stored in a packet supplied from the packet forwarding apparatus, from the changed bit rate notified by the notification scheme into a bit rate transmittable and receivable by a second mobile terminal connected to the radio network controller, and transmitting the converted compressed-and-encoded bit stream to the radio network controller.

7. The voice communication method according to claim 6, further comprising:
by the gateway apparatus, converting, when congestion has occurred on the mobile high-speed network and the bit rate of voice transmitted or received by the first mobile terminal connected to the packet forwarding apparatus has been changed, a voice compressed-and-encoded bit stream supplied from the radio network controller into the changed bit rate notified by the notification scheme, and transmitting the converted compressed-and-encoded bit stream to the packet forwarding apparatus.

8. The voice communication method according to claim 6, wherein the notification scheme includes notifying the changed bit rate is executed using RTCP (Real-time Transport Control Protocol) APP or CMR (Codec Mode Request).

9. The voice communication method according to claim 6, wherein the control signal is transmitted and received using SIP (Session Initiation Protocol)/SDP (Session Description Protocol).

10. The voice communication method according to claim 6, wherein the mobile high-speed network is at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

11. A non-transient non-transitory computer-readable recording medium, storing a program that causes a gateway apparatus, upon execution by said gateway apparatus, to execute:
  connecting voice communication between a packet forwarding apparatus on a mobile high-speed network and a radio network controller on a mobile circuit-switched network via an IMS (IP Multimedia Subsystem) network;
  exchanging with a first mobile terminal connected to the packet forwarding apparatus a control signal indicative of whether at least one of the bit rates of voice transmitted and received by the first mobile terminal can be changed when congestion has occurred on the mobile high-speed network and indicative of a notification scheme of a changed bit rate between the gateway apparatus and the first mobile terminal; and
  converting, when congestion has occurred on the mobile high-speed network and a bit rate of voice transmitted or received by the first mobile terminal has been changed to the changed bit rate, a bit rate of a voice compressed-and-encoded bit stream stored in a packet supplied from the packet forwarding apparatus, from the changed bit rate notified by the notification scheme into a bit rate transmittable and receivable by a second mobile terminal connected to the radio network controller, and transmitting the converted compressed-and-encoded bit stream to the radio network controller.

12. The gateway apparatus according to claim 2, wherein the control signal transmission and reception unit transmits and receives the control signal using SIP (Session Initiation Protocol)/SDP (Session Description Protocol).

13. The gateway apparatus according to claim 3, wherein the control signal transmission and reception unit transmits and receives the control signal using SIP (Session Initiation Protocol)/SDP (Session Description Protocol).

14. The gateway apparatus according to claim 2, wherein the mobile high-speed network is at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

15. The gateway apparatus according to claim 3, wherein the mobile high-speed network is at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

16. The gateway apparatus according to claim 4, wherein the mobile high-speed network is at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

17. The voice communication method according to claim 7, wherein the notification scheme includes notifying the changed bit rate is executed using RTCP (Real-time Transport Control Protocol) APP or CMR (Codec Mode Request).

18. The voice communication method according to claim 7, wherein the control signal is transmitted and received using SIP (Session Initiation Protocol)/SDP (Session Description Protocol).

19. The voice communication method according to claim 8, wherein the control signal is transmitted and received using SIP (Session Initiation Protocol)/SDP (Session Description Protocol).

20. The voice communication method according to claim 7, wherein the mobile high-speed network is at least one of a mobile LTE (Long Term Evolution)/EPC (Evolved Packet Core) network, HSPA (High Speed Packet Access), HSPA+, HNB (Home NodeB), HeNB (Home eNodeB), and WiMax (Worldwide Interoperability for Microwave Access).

* * * * *